United States Patent
Ooi et al.

(10) Patent No.: US 10,759,301 B2
(45) Date of Patent: Sep. 1, 2020

(54) SYSTEMS AND METHODS FOR REDUCING CURRENT DRAIN IN BATTERIES

(71) Applicant: MOTOROLA SOLUTIONS, INC., Chicago, IL (US)

(72) Inventors: Thean Song Ooi, Penang (MY); Amy T. Herrmann, Suwanee, GA (US); Michael D. Geren, Suwanee, GA (US); Kow Chee Chong, Penang (MY); Roger L. Boyer, Hoschton, GA (US); Muhamad Ridzuan Azizan, Kedah (MY); Scott J. Arendell, Buford, GA (US); John E. Herrmann, Suwanee, GA (US); Macwien Krishnamurthi, Selangor (MY); Roy L. Kerfoot, Jr., Lilburn, GA (US); William B. Kiger, Hoschton, GA (US)

(73) Assignee: MOTOROLA SOLUTIONS, INC., Chicago, IL (US)

(*) Notice: Subject to any disclaimer, the term of this patent is extended or adjusted under 35 U.S.C. 154(b) by 427 days.

(21) Appl. No.: 15/803,368

(22) Filed: Nov. 3, 2017

(65) Prior Publication Data
US 2019/0135127 A1 May 9, 2019

(51) Int. Cl.
| H02J 7/00 | (2006.01) |
| B60L 58/12 | (2019.01) |
| B60L 58/24 | (2019.01) |
| B60L 58/40 | (2019.01) |

(52) U.S. Cl.
CPC ............... *B60L 58/12* (2019.02); *B60L 58/24* (2019.02); *B60L 58/40* (2019.02); *H02J 7/0029* (2013.01); *H02J 7/0069* (2020.01); *H02J 7/00306* (2020.01)

(58) Field of Classification Search
CPC ..................................................... H02J 7/0029
USPC ........................................................ 320/112
See application file for complete search history.

(56) References Cited

U.S. PATENT DOCUMENTS

| 6,072,250 | A | 6/2000 | Thandiwe et al. | |
| 6,144,186 | A | 11/2000 | Thandiwe et al. | |
| 6,545,447 | B1 | 4/2003 | Smith | |
| 7,068,012 | B1 | 6/2006 | Geren et al. | |
| 8,305,725 | B2 * | 11/2012 | Ooi | H01M 2/1066 361/103 |
| 2010/0085018 | A1 * | 4/2010 | Cruise | H01M 10/425 320/150 |

* cited by examiner

*Primary Examiner* — Edward Tso
*Assistant Examiner* — Ahmed H Omar
(74) *Attorney, Agent, or Firm* — Michael Best & Friedrich LLP

(57) ABSTRACT

A method for charging a battery includes detecting, with an electronic processor, a presence of the battery coupled to a charging interface. The method includes receiving, with the electronic processor, a command, the command including a charge mode. The method includes, in response to receiving the command, controlling a charging circuit coupled to the charging interface to charge the battery to a predetermined level based on the charge mode. The method includes, when the battery reaches the predetermined charge level, sending a battery control command, based on the charge mode, to control an active limiting circuit of the battery via a single wire data line coupled to the charging interface.

20 Claims, 4 Drawing Sheets

SYSTEMS AND METHODS FOR REDUCING CURRENT DRAIN IN BATTERIES

BACKGROUND OF THE INVENTION

Battery-powered electronic devices, for example, portable communication devices, may need to operate in hazardous locations. For example, public safety personnel may need to communicate via radio in an area that contains flammable gases. To comply with applicable regulations, some battery-powered electronic devices are powered with hazardous location ("Hazloc") batteries. Such batteries include active limiting circuits to monitor and control current and voltage within the batteries to comply with the applicable regulations. The active limiting circuits are on even when the battery containing them is removed from the electronic device. The operation of these circuits may drain power from the battery, during shipping and storage. Some active limiting circuits feature fault tolerance and redundant components, which further contributes to the power drain.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
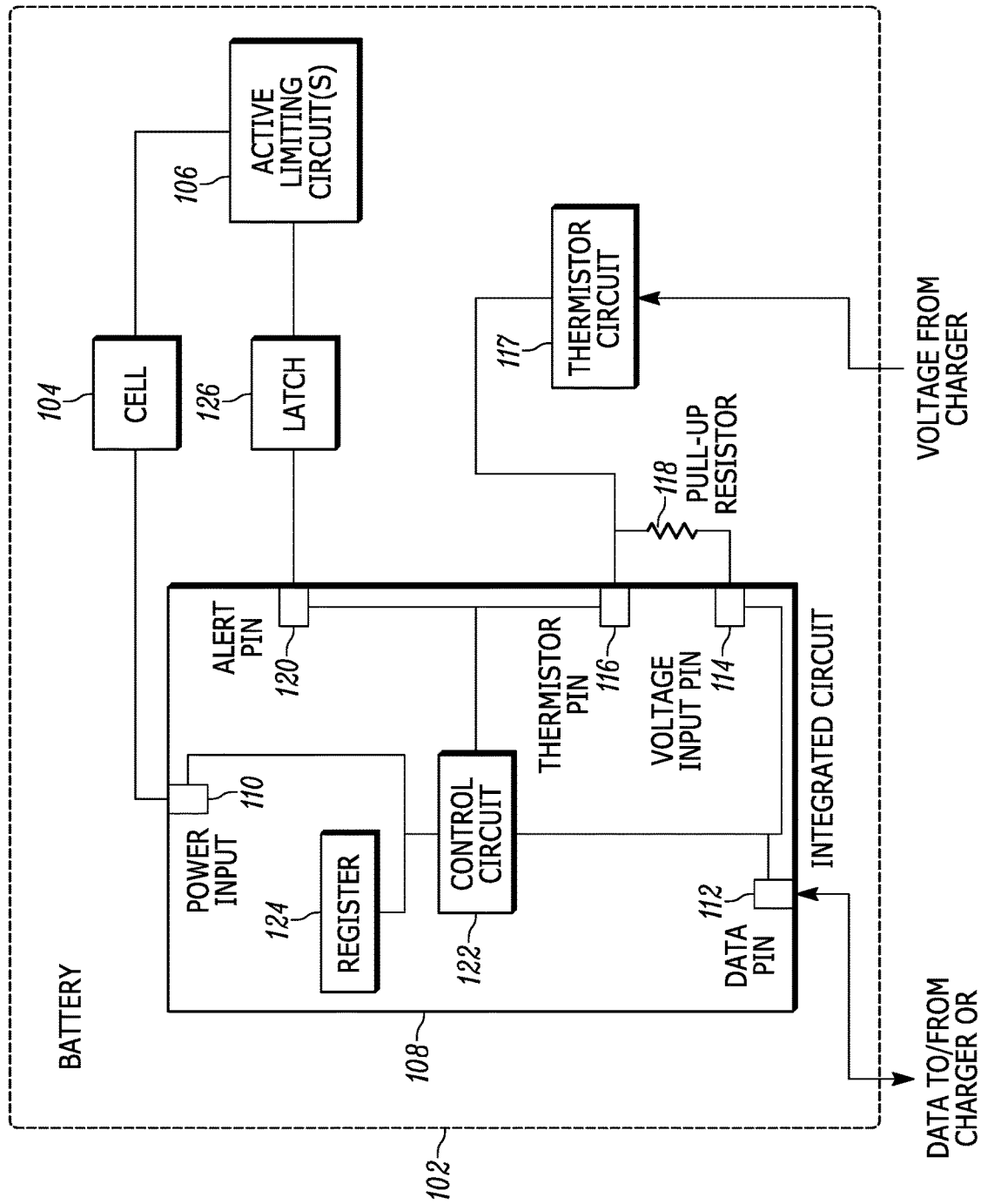
FIG. 1 is a block diagram of a battery for a portable electronic device in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

To comply with applicable regulations, some battery-powered electronic devices are powered with hazardous location ("Hazloc") batteries. Such batteries include active limiting circuits, which may drain power from the batteries during shipping and storage. In addition, regulations on the shipment of batteries may require such batteries to ship with limited charge levels (for example, 30% of capacity). Lower initial charge levels coupled with the power drain from the active limiting circuits may result in a customer receiving a new battery that is deeply drained. When a battery is discharged beyond a minimum charge level, damage to the battery's cells may result. In some cases, the damage may cause the battery to no longer take a charge.

Accordingly, embodiments described herein provide for, among other things, systems and methods for reducing current drain in batteries, and, in particular, reducing current drain in hazardous location batteries. Using such embodiments, the active limiting circuits are shut down prior to shipping and storage. Current drain during shipment and storage is thereby reduced, allowing the batteries to be charged and stored for extended periods of time, such as a year or more in some embodiments, without undue current drain. Furthermore, such embodiments allow for re-activating the active limiting circuits by placing the batteries in a charger.

One example embodiment provides a battery. The battery includes a cell, an active limiting circuit electrically coupled to the cell, and an integrated circuit. The integrated circuit includes a power input coupled to the cell, a single wire data pin, a voltage input pin, a thermistor pin coupled to the voltage pin with a pull-up resistor, and an alert pin coupled to the active limiting circuit. The integrated circuit is configured to monitor the single wire data pin for commands. The integrated circuit is configured to, in response to receiving a sleep command on the single wire data pin, assert a low logic state on the alert pin to deactivate the active limiting circuit and monitor a voltage on the voltage input pin. The integrated circuit is configured to, in response to detecting a pull-up voltage on the voltage input pin, assert a high logic state on the alert pin to activate the active limiting circuit.

Another example embodiment provides a battery charger. The battery charger includes a charging interface for receiving a battery, a charging circuit coupled to the charging interface, a single wire data line coupled to the charging interface, and an electronic processor coupled to the charging circuit and the single wire data line. The electronic processor is configured to detect the presence of the battery coupled to the charging interface. The electronic processor is configured to receive a command, the command including a charge mode. The electronic processor is configured to, in response to receiving the command, control the charging circuit to charge the battery to a predetermined level based on the charge mode. The electronic processor is configured to, when the battery reaches the predetermined charge level, send a battery control command, based on the charge mode, to control an active limiting circuit of the battery via the single wire data line.

Yet another example embodiment provides a method for charging a battery. The method includes detecting, with an electronic processor, a presence of the battery coupled to a charging interface. The method includes receiving, with the electronic processor, a command, the command including a charge mode. The method includes, in response to receiving the command, controlling a charging circuit coupled to the charging interface to charge the battery to a predetermined level based on the charge mode. The method includes, when the battery reaches the predetermined charge level, sending a battery control command, based on the charge mode, to control an active limiting circuit of the battery via a single wire data line coupled to the charging interface.

For ease of description, some or all of the example systems presented herein are illustrated with a single exemplar of each of its component parts. Some examples may not describe or illustrate all components of the systems. Other example embodiments may include more or fewer of each of the illustrated components, may combine some components, or may include additional or alternative components.

FIG. 1 illustrates an example embodiment of a battery 102 for use with an electronic device. For example, the battery 102 may be used to power a portable two-way radio, for example, a Motorola® ASTRO® 25 or APX™ model radio. The battery 102 includes a cell 104, an active limiting circuit 106, and an integrated circuit 108. The cell 104 is an electrochemical cell (for example, a lithium-ion cell) for storing and providing electrical power. In other embodiments, the battery 102 may include more than one cell 104 arranged in series, in parallel, or a combination of both to provide a voltage level and storage capacity required by the electronic device.

The active limiting circuit 106 includes electronic components for monitoring and limiting current and voltage within the battery 102 according to, for example, applicable hazardous location regulations and standards. For example, the active limiting circuit 106 may limit current and voltage within the battery to comply with the European Union Directive 2014/34/EU on equipment for use in potentially explosive atmospheres (ATEX), the International Electrotechnical Commission System for Certification to Standards relating to Equipment for use in Explosive Atmospheres (IECEx), or the National Electrical Code (NEC) hazardous location standard (HAZLOC). In some embodiments, the active limiting circuit 106 includes one or more voltage regulators, references, comparators, metal-oxide-semiconductor field-effect transistors (MOSFETs), and the like. In some embodiments, the active limiting circuit 106 includes redundant components, fault-tolerant configurations, or both. In some embodiments, the battery 102 may include multiple active limiting circuits 106. As illustrated in FIG. 1, the active limiting circuit 106 is coupled to and draws power from the cell 104. As described in detail below, the active limiting circuit 106 can be activated and de-activated by the integrated circuit 108.

The integrated circuit 108 includes a power input 110, a single wire data pin 112, a voltage input pin 114, a thermistor pin 116, a pull-up resistor 118, an alert pin 120, a control circuit 122, and a register 124. In some embodiments, the integrated circuit 108 is an application specific integrated circuit (ASIC) (for example, a single wire addressable integrated circuit such as the MAX17211/MAX17215 Fuel Gauge by Maxim Integrated™) configured to operate as described herein. The integrated circuit 108 is powered by electrical power received from the cell 104 via the power input 110.

As illustrated in FIG. 1, the single wire data pin 112, the voltage input pin 114, the thermistor pin 116, the alert pin 120, and the register 124 are electrically coupled to the control circuit 122. The control circuit 122 includes digital logic circuits configured to control the operation of the integrated circuit 108 as described herein. For example, the control circuit 122 can detect or produce voltage levels at the voltage input pin 114, the thermistor pin 116, and the alert pin 120.

As described below, the single wire data pin 112 interfaces with an external device (for example, a battery charger or a portable electronic device). The single wire data pin 112 is coupled to the control circuit 122, which allows communication between the control circuit 122 and the external device via the single wire data pin 112. Using the single wire data pin 112, the control circuit 122 can send and receive commands and data to and from the external device. For example, the control circuit 122 may transmit data including a model number of the battery 102, the current charge level of the cell 104, the number of charge cycles for the cell 104, and the like. As described in detail below, the control circuit 122 may receive, via the single wire data pin 112, commands relating to the operation of the active limiting circuit 106.

The voltage input pin 114 is electrically coupled to the control circuit 122 to detect a voltage present at the voltage input pin 114. As illustrated in FIG. 1, the voltage input pin 114 is coupled to the thermistor pin 116 with a pull-up resistor 118. When the battery 102 is charging, the battery charger charging the battery 102 applies a voltage to a thermistor circuit 117 to activate the thermistor circuit 117. The thermistor circuit 117 may be used by the integrated circuit 108 to monitor battery temperature during charging. Accordingly, the pull-up resistor 118 produces a voltage at the voltage input pin 114 during charging.

The alert pin 120 is electrically coupled to the control circuit 122 and the active limiting circuits 106, via a latch 126 (for example, an edge triggered latch). The control circuit 122 is configured to apply either a high logic state (for example, +5V) or a low logic state (for example, zero volts) at the alert pin 120. When a high logic state is applied at the alert pin 120, the latch 126 closes, and turns on the active limiting circuit 106. When a low logic state is applied at the alert pin 120, the latch 126 opens, and turns off the active limiting circuit 106.

The register 124 is a memory that stores data (for example, binary data), which can be read from or written to by the control circuit 122. Particular portions of the register 124 may be dedicated to storing data related to particular operations of the integrated circuit 108. For example, a particular bit, when set to 1 and read by the control circuit 122, may cause the control circuit 122 to establish a high or a low logic state on a pin. In another example, a particular byte, when set to a predetermined value, may cause the control circuit 122 to establish a high or a low logic state on a pin.

Figure 2:
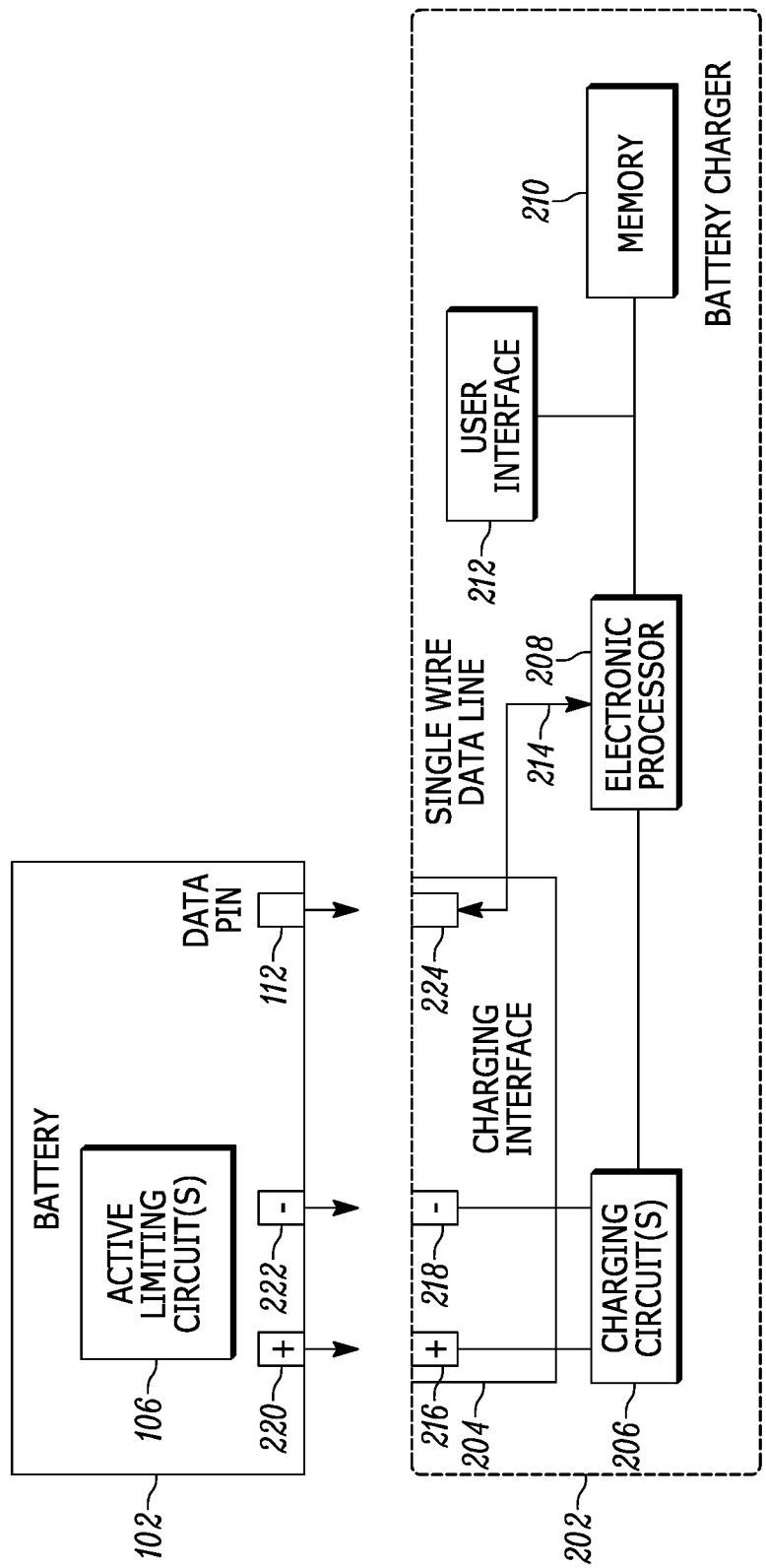
FIG. 2 is a block diagram of a battery charger in accordance with some embodiments.

FIG. 2 illustrates an example embodiment of a battery charger 202. The battery charger 202 includes a charging interface 204, a charging circuit 206, an electronic processor 208, a memory 210, and a user interface 212. The battery charger 202 is constructed of plastic or another suitable material, and may be configured to sit on a horizontal surface or mount to a vertical surface. In some embodiments, the battery charger 202 is one of the Motorola® IMPRES™ family of battery chargers. The charging circuit 206, the electronic processor 208, the memory 210, and the user interface 212, along with other various modules and components, are coupled to each other by or through one or more electrical connections, which may include, for example, control or data buses that enable communication therebetween. The use of control and data buses for the interconnection between and exchange of information among the various modules and components would be apparent to a person skilled in the art in view of the description provided herein. In some embodiments, the battery charger 202 may include other digital and analog components, which for brevity are not described herein and that may be implemented in hardware, software, or a combination of both for controlling the components of the battery charger 202.

The charging interface 204 is configured to physically receive a battery (for example, the battery 102) for charging. For example, the charging interface 204 may be a socket or other physical feature of the battery charger 202 sized and shaped to receive the battery 102. The charging interface 204 includes a positive terminal 216 and a negative terminal 218. The positive terminal 216 and the negative terminal 218 interface a battery positive terminal 220 and a battery negative terminal 222, respectively, of the battery 102 to provide power from the charging circuit 206 to the battery 102. The charging circuit 206 includes suitable electronic components for charging the battery 102 using the direct current signal via the charging interface 204.

The charging interface 204 also includes a charger data pin 224. The charger data pin 224 interfaces with the single wire data pin 112 of the battery 102 to send and receive data and commands to and from the battery 102 and the electronic processor 208 included in the battery charger 202 via a single wire data line 214. In one example, the electronic processor 208 receives from the battery 102 information regarding a model number and current charge level of the battery 102 via the charger data pin 224. In another example, as set forth below, the electronic processor 208 sends commands to the control circuit 122 of the battery 102 relating to the operation of the active limiting circuits 106 via the charger data pin 224.

The electronic processor 208 controls the components of the battery charger 202. The electronic processor 208 obtains and provides information (for example, from the memory 210, the user interface 212, or both and processes the information by executing one or more software instructions or modules, capable of being stored, for example, in a random access memory ("RAM") area of the memory 210 (for example, during execution), a read only memory ("ROM") of the memory 210 (for example, on a generally permanent basis), another non-transitory computer readable medium, or a combination thereof. The software may include firmware, one or more applications, program data, filters, rules, one or more program modules, and other executable instructions. The electronic processor 208 retrieves from the memory 210 and executes, among other things, software related to the control processes and methods described herein.

The memory 210 may include one or more non-transitory computer-readable media, and includes a program storage area and a data storage area. The program storage area and the data storage area can include combinations of different types of memory, as described herein.

The user interface 212 receives user input, provides system output, or a combination of both. User input may be provided via, for example, a keypad, soft keys, icons, or soft buttons on a display screen (not shown), a scroll ball, buttons, and the like. System output may be provided via light sources, speakers, or a suitable display device (for example, a liquid crystal display (LCD) or a touch screen). The user interface 212 may include a graphical user interface (GUI) (for example, generated by the electronic processor 208 from instructions and data stored in the memory 210 and presented on a display device) that enables a user to interact with the battery charger 202.

As noted above, the operation of active limiting circuits during battery storage and shipping may critically drain a battery's cells. Accordingly, methods are provided herein for operating the battery 102 and the battery charger 202 to control the operation of the active limiting circuits and reduce the current drain on the battery 102.

Figure 3:
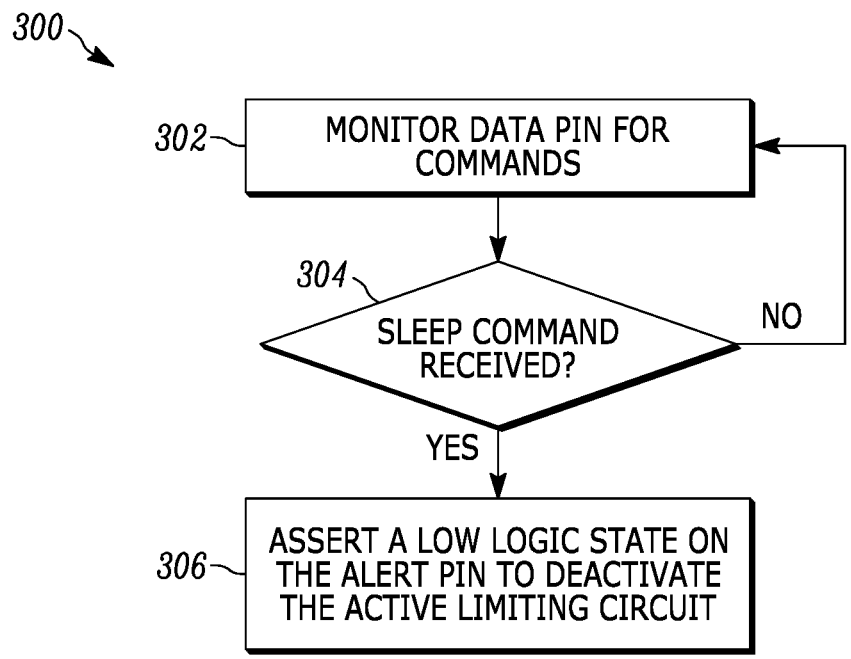
FIG. 3 is a flowchart of a method for operating the battery of FIG. 1 in accordance with some embodiments.

FIG. 3 illustrates an example method 300 for operating the battery 102. The method 300 includes monitoring the integrated circuit 108 and, in particular, the control circuit 122, the single wire data pin 112 for commands (at block 302). For example, while the battery 102 is coupled to the charging interface 204 of the battery charger 202, the single wire data pin 112 may receive commands from the electronic processor 208. As commands are received, the integrated circuit 108 checks to see whether a sleep command is received (at block 304). When no sleep command is received or the command received is not a sleep command, the integrated circuit 108 continues monitoring the single wire data pin 112 for commands (at block 302). When a sleep command is received, the integrated circuit 108 asserts a low logic state on the alert pin 120 to deactivate the active limiting circuit 106. In some embodiments, the low logic state causes the latch 126 to open disconnecting the active limiting circuit 106 from the cell 104, from ground, or both. In some embodiments, the active limiting circuit 106 may be effectively disconnected from the cell 104 by coupling a very large (for example, a 1 MΩ) resistor (not shown) between the active limiting circuit 106 and the cell 104. In some embodiments, the integrated circuit 108 clears the register 124, or a portion thereof, in response to receiving the sleep command. For example, in some embodiments, the register 124 may contain a bit, which, when set, causes the control circuit 122 to assert a high logic state on the alert pin 120. In such embodiments, the integrated circuit 108 clears this bit when it receives a sleep command. In some embodiments, the control circuit 122 is configured to periodically check the register 124 and to assert a high logic state on the alert pin 120 when the register 124 is set and to assert a low logic state on the alert pin 120 when the register 124 is cleared. Using the method 300, the active limiting circuit 106 of battery 102 is deactivated to reduce current drain during shipping or storage of the battery 102.

Figure 4:
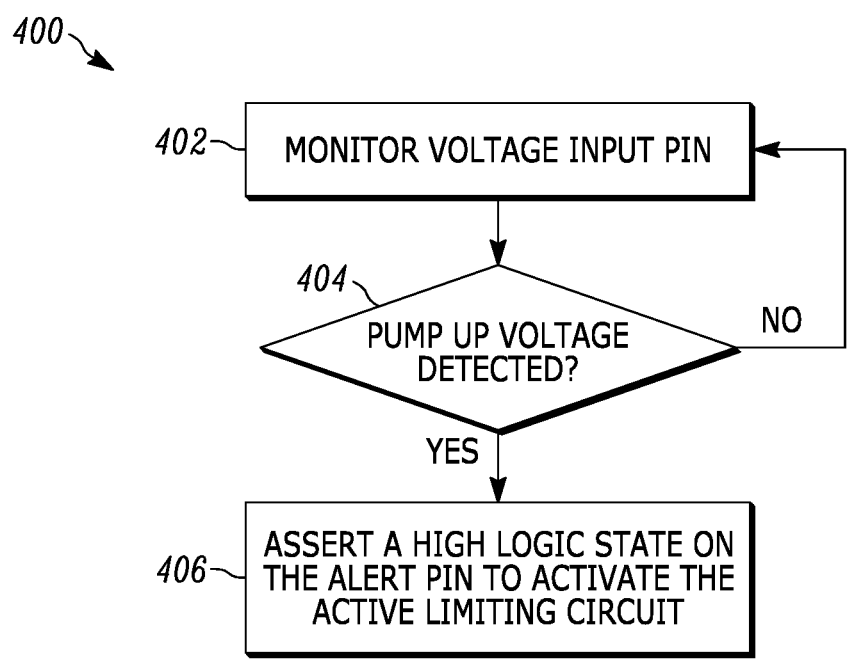
FIG. 4 is a flowchart of a method for operating the battery of FIG. 1 in accordance with some embodiments.

To use the battery 102 in a hazardous location, the active limiting circuit 106 of battery 102 must be activated. FIG. 4 illustrates an example method 400 for operating the battery 102 to active the active limiting circuit 106. The method 400 includes monitoring with the integrated circuit 108 and, in particular, the control circuit 122, the voltage level of the voltage input pin 114 (at block 402). As voltage level is read, the integrated circuit 108 checks periodically to see whether a pull-up voltage is detected (at block 404). For example, the integrated circuit 108 may detect a pull-up voltage when a voltage detected at the voltage input pin 114 is greater than the difference between a voltage on the thermistor pin and a battery detection threshold hysteresis voltage. When a pull-up voltage is not detected, the integrated circuit 108 continues monitoring voltage level of the voltage input pin 114 (at block 402). When a pull-up voltage is detected, the integrated circuit 108 asserts a high logic state on the alert pin 120 to activate the active limiting circuit 106. In some embodiments, the high logic state causes the latch 126 to close, connecting the active limiting circuit 106 to the cell 104, to ground, or both. In some embodiments, the integrated circuit 108 sets the register 124, or a portion thereof, in response to detecting the pull-up voltage.

Using the method 300, the active limiting circuit 106 can be turned off using a digital command received using the existing single wire data pin 112. Using the method 400, the active limiting circuit 106 can be turned on when the battery 102 is inserted into the charger 202. Accordingly, control of the active limiting circuit 106 is implemented without the addition of a dedicated control pin.

Figure 5:
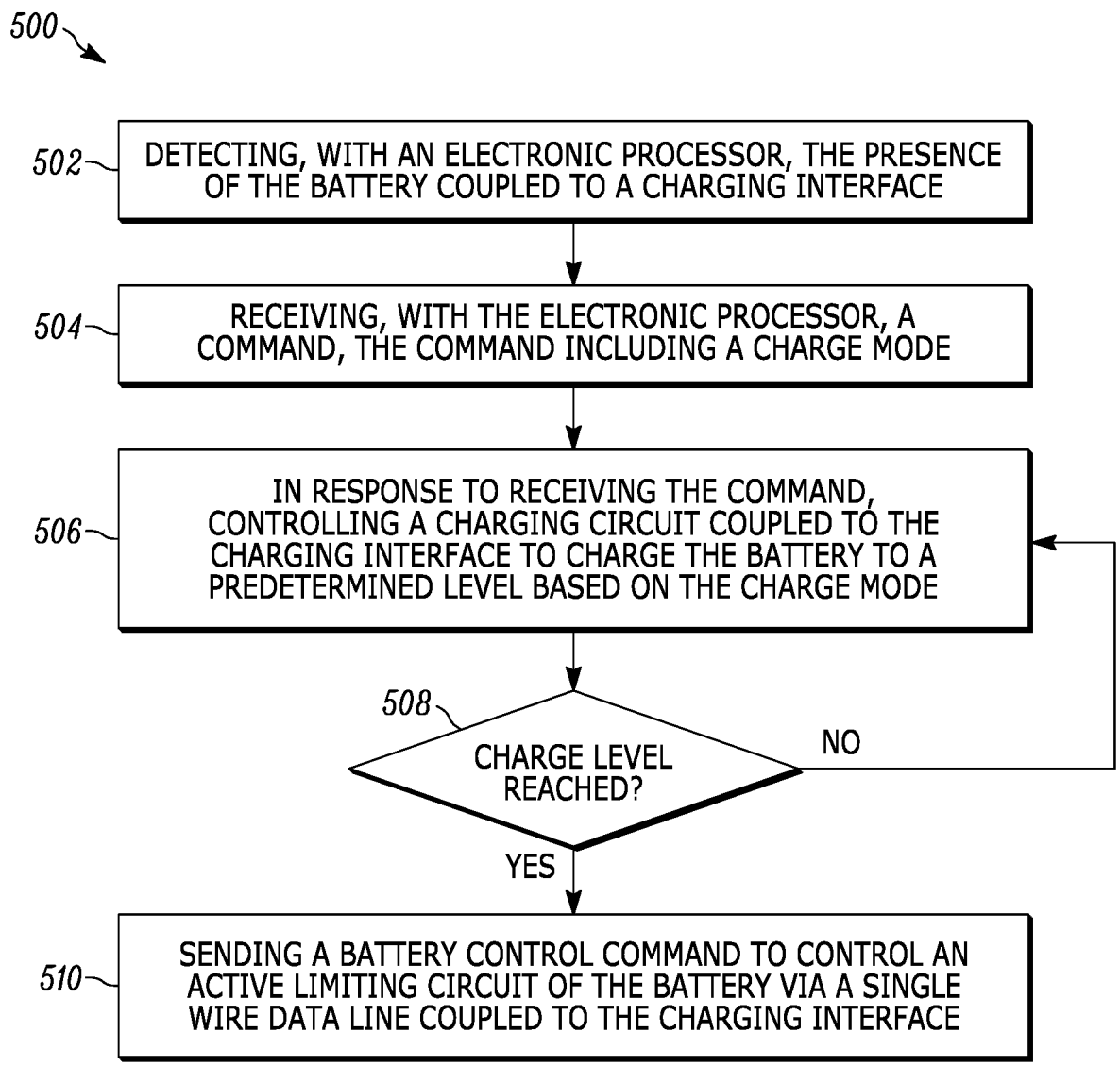
FIG. 5 is a flowchart of a method for charging a battery with the battery charger of FIG. 2 in accordance with some embodiments.

As noted above, the battery 102 activates and deactivates the active limiting circuit 106 based on commands and detected voltages. In some embodiments, the commands and voltages are produced by the battery charger 202. FIG. 5 illustrates an example method 500 for charging the battery 102 with the battery charger 202. As an example, the method 500 is described as being performed by the electronic processor 208. However, it should be understood that in some embodiments, portions of the method 500 may be performed by other components.

The method 500 includes detecting, with the electronic processor 208, the presence of the battery 102 coupled to the charging interface 204 (at block 502). For example, the charging circuit 206 may detect a change in voltage across the positive terminal 216 and the negative terminal 218 when the battery 102 electrically couples to the charging interface 204.

In some embodiments, before the battery charger 202 charges the battery 102, the battery charger 202 receives a command that includes a charge mode (at block 504). For example, the electronic processor 208 may receive a command to charge the battery 102 from the user interface 212. The charge mode indicates a predetermined charge level based, for example, on the indented use of the battery being charged. In one example, the charge mode is an operational charging mode, which charges the battery for powering an electronic device. In some embodiments, the predetermined charge level for the operational mode is 100% of a full charge. In another example, the charge mode is a maintenance charging mode, which charges the battery for storage or shipment. In some embodiments, the predetermined charge level for the maintenance mode is 25%, 50%, or 75% of a full charge, depending on applicable standards or regulations, the anticipated length of storage or shipment, or both.

In response to receiving the command (at block 506), the electronic processor 208 controls the charging circuit 206 to charge the battery 102 to a predetermined level based on the charge mode. For example, the electronic processor 208 controls the charging circuit 206 to apply a steady current to the charging interface 204 until a specified voltage is read across the positive terminal 216 and the negative terminal 218. In some embodiment, the electronic processor 208 may control the charging circuit 206 to apply a current based on a charge level provided by the battery 102 via the single wire data line 214. The electronic processor 208 monitors the battery's current charge level to check whether the predetermined charge level has been met (at block 508). When the predetermined charge level has not been met, the electronic processor 208 continues to control the charging circuit 206 to charge the battery 102 (at block 506).

When the battery 102 reaches the predetermined charge level, the electronic processor 208 sends, via the single wire data line 214, a battery control command to control the active limiting circuit 106 of the battery 102. The battery control command is based on the charge mode. For example, for the operational charging mode, the battery control command is a wake command. The wake command, when received by the battery 102, causes the integrated circuit 108 to assert a high logic state on the alert pin 120, thereby activating the active limiting circuit 106. Accordingly, when the battery is charged for use in potentially hazardous locations, the active limiting circuit 106 is operated as intended.

In another example, for the maintenance charging mode, the battery control command is a sleep command. The sleep command, when received by the battery 102, causes the integrated circuit 108 to assert a low logic state on the alert pin 120, which deactivates the active limiting circuit 106. Accordingly, when the battery is charged for storage or shipment, any active limiting circuits are not drawing current from the battery's cells.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A battery comprising:
   a cell;
   an active limiting circuit electrically coupled to the cell; and
   an integrated circuit including
      a power input coupled to the cell,
      a single wire data pin,
      a register,
      a voltage input pin,
      a thermistor pin coupled to the voltage pin with a pull-up resistor, and
      an alert pin coupled to the active limiting circuit,
   the integrated circuit configured to
      monitor the single wire data pin for commands,
      in response to receiving a sleep command on the single wire data pin, clear the register to assert a low logic state on the alert pin to deactivate the active limiting circuit,
      monitor a voltage on the voltage input pin, and
      in response to detecting a pull-up voltage on the voltage input pin,
   set the register to assert a high logic state on the alert pin to activate the active limiting circuit.

2. The battery of claim 1, wherein the integrated circuit is further configured to set the register in response to detecting a pull-up voltage on the voltage input pin.

3. The battery of claim 1, wherein the integrated circuit is further configured to clear the register in response to receiving a sleep command on the single wire data pin.

4. The battery of claim 1, wherein the integrated circuit is further configured to detect a pull-up voltage when a first voltage detected at the voltage input pin is greater than a difference between a second voltage on the thermistor pin and a battery detection threshold hysteresis voltage.

5. The battery of claim 1, further comprising an edge triggered latch coupled to the alert pin and the active limiting circuit, the edge triggered latch configured to
   close when a high logic state is asserted on the alert pin; and
   open when a low logic state is asserted on the alert pin.

6. The battery of claim 1, wherein the integrated circuit is a single wire addressable switch integrated circuit.

7. The battery of claim 1, wherein the active limiting circuit includes at least one selected from a group consisting of a voltage regulator, a reference, a comparator, and a metal-oxide-semiconductor field-effect transistor.

8. The battery of claim 1, wherein the integrated circuit is further configured to assert a low logic state on the alert pin to deactivate the active limiting circuit in response to being placed in one of a shipping container or a storage container.

9. A battery charger comprising:
   a charging interface for receiving a battery;
   a charging circuit coupled to the charging interface;
   a single wire data line coupled to the charging interface; and
   an electronic processor coupled to the charging circuit and the single wire data line, the electronic processor configured to
      detect the presence of the battery coupled to the charging interface;
      receive a command, the command including a charge mode;
      in response to receiving the command, control the charging circuit to charge the battery to a predetermined level based on the charge mode; and
      when the battery reaches the predetermined charge level, send a battery control command, based on the charge mode, to control an active limiting circuit of the battery via the single wire data line.

10. The battery charger of claim 9, further comprising:
    a user interface,
    wherein the electronic processor is further configured to receive the command from the user interface.

11. The battery charger of claim 9, wherein the charge mode is an operational charging mode and the battery control command is a wake command.

12. The battery charger of claim 11, wherein the predetermined charge level is 100% of a full charge of the battery.

13. The battery charger of claim 9, wherein the charge mode is a maintenance charging mode and the battery control command is a sleep command.

14. The battery charger of claim 13, wherein the predetermined charge level is one of a group consisting of 25%, 30%, 50%, and 75% of a full charge of the battery.

15. A method for charging a battery, the method comprising:
    detecting, with an electronic processor, a presence of the battery coupled to a charging interface;
    receiving, with the electronic processor, a command, the command including a charge mode;
    in response to receiving the command, controlling a charging circuit coupled to the charging interface to charge the battery to a predetermined level based on the charge mode; and
    when the battery reaches the predetermined charge level, sending a battery control command, based on the charge mode, to control an active limiting circuit of the battery via a single wire data line coupled to the charging interface.

16. The method of claim 15, wherein receiving the command includes receiving the command via a user interface coupled to the electronic processor.

17. The method of claim 15, wherein sending a battery control command includes receiving a wake command including an operational charging mode.

18. The method of claim 17, wherein charging the battery to a predetermined level includes charging the battery to a charge level of 100% of a full charge of the battery.

19. The method of claim 15, wherein sending a battery control command includes receiving a sleep command including a maintenance charging mode.

20. The method of claim 19, wherein charging the battery to a predetermined level includes charging the battery to a charge level of one of a group consisting of 25%, 30%, 50%, and 75% of a full charge of the battery.

* * * * *